(12) United States Patent
Guillemaut et al.

(10) Patent No.: US 9,656,742 B2
(45) Date of Patent: May 23, 2017

(54) AIR EJECTION DEVICE COMPRISING AN AERODYNAMIC PROFILE PROVIDED WITH A SLOT OBTURATING FLEXIBLE TONGUE

(71) Applicant: AIRBUS OPERATIONS S.A.S., Toulouse (FR)

(72) Inventors: Julien Guillemaut, Toulouse (FR); Arnaud Hormiere, Toulouse (FR); Jerome Colmagro, Toulouse (FR); Cesar Garnier, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 14/561,488

(22) Filed: Dec. 5, 2014

(65) Prior Publication Data
US 2015/0158577 A1 Jun. 11, 2015

(30) Foreign Application Priority Data

Dec. 5, 2013 (FR) ...................................... 13 62160

(51) Int. Cl.
*B64C 21/04* (2006.01)
*B64C 21/08* (2006.01)
*B64D 29/04* (2006.01)

(52) U.S. Cl.
CPC .............. *B64C 21/04* (2013.01); *B64C 21/08* (2013.01); *B64D 29/04* (2013.01); *Y02T 50/166* (2013.01)

(58) Field of Classification Search
CPC ....... B64C 21/00; B64C 21/02; B64C 21/025; B64C 21/04; B64C 21/06; B64C 21/08
See application file for complete search history.

(56) References Cited

U.S. PATENT DOCUMENTS 1,586,226 A 5/1926 Tartrais
2,267,927 A * 12/1941 Kightlinger ........... B64C 21/025
244/200

(Continued)

FOREIGN PATENT DOCUMENTS

DE 1951422 A1 4/1971
EP 0626180 A1 11/1994
(Continued)

OTHER PUBLICATIONS

French Patent Office, French Search Report for French Patent Application 1362160 mailed Oct. 15, 2014.

*Primary Examiner* — Tien Dinh
*Assistant Examiner* — Richard R Green
(74) *Attorney, Agent, or Firm* — Lorenz & Kopf, LLC (57) ABSTRACT

An air ejection device comprises an aerodynamic profile provided with a slot and an ejection nozzle. The device comprises a flexible tongue fixed flush with the aerodynamic profile in such a way as to obstruct the slot, the tongue being able to lift under the effect of a pressure differential between the air situated in the ejection nozzle and the outside air. The tongue makes it possible for the slot made in the profile to be obstructed during phases of flight during which the ejection of the air is unnecessary, and prevents external air from entering the slot. The flow of air over the aerodynamic profile is unaffected, and there is no increase in drag. Because the tongue lifts as a result of a pressure differential, it does not require any control mechanism to lift it.

19 Claims, 4 Drawing Sheets (56) References Cited

U.S. PATENT DOCUMENTS

| | | | | |
|---|---|---|---|---|
| 4,296,899 A * | 10/1981 | Isenberg | ............... | B64C 21/00 |
| | | | | 244/207 |
| 6,210,266 B1 * | 4/2001 | Barton | ............... | B29C 45/1676 |
| | | | | 137/855 |
| 7,013,895 B2 * | 3/2006 | Martin | ............... | A62B 18/10 |
| | | | | 128/205.24 |
| 8,201,775 B2 * | 6/2012 | Treimer | ............... | B64C 1/18 |
| | | | | 244/129.1 |
| 8,387,923 B2 * | 3/2013 | Catino | ............... | B64C 21/025 |
| | | | | 244/207 |

FOREIGN PATENT DOCUMENTS

| | | |
|---|---|---|
| FR | 2971765 A1 | 8/2012 |
| GB | 2486342 A | 6/2012 |
| JP | H07117794 A | 5/1995 |

\* cited by examiner

AIR EJECTION DEVICE COMPRISING AN AERODYNAMIC PROFILE PROVIDED WITH A SLOT OBTURATING FLEXIBLE TONGUE

CROSS-REFERENCE TO RELATED APPLICATION

This application claims priority to French Patent Application No. 1362160, filed Dec. 5, 2013, which is incorporated herein by reference in its entirety.

TECHNICAL FIELD

Embodiments described herein relate generally to an aerodynamic profile provided with an air ejection device. More particularly, embodiments described herein relate to a pylon supporting a propulsion unit for an aircraft comprising such an aerodynamic profile and to an aircraft comprising such a pylon.

BACKGROUND

During the course of its motion, any aerodynamic profile of a vehicle is exposed to the wake of other profiles of this vehicle, or to phenomena that disturb its boundary layer of air. Aircraft in which the propulsion unit is situated on a pylon are particularly affected because, whatever its design, the pylon generates a wake. This is notably caused by the fact that the thickness of the boundary layer of the profile of the pylon increases in the downstream direction of the profile. Thus, a "velocity shortfall" (or "velocity deficit") embodied by a difference between the velocity of the free flow of the air and the local velocity of the air in the downstream zone of the profile occurs at the trailing edge of the pylon. The zone exhibiting this velocity shortfall is also the site of a "mass flow rate shortfall" (or "mass flow rate deficit") regarding the air. As a result, the air has a tendency to be pulled into the velocity shortfall zone, thus causing turbulence.

The discontinuity in the velocities and the turbulence in the wake cause, amongst other things, an increase in the noise generated by the fans of the turbine of the propulsion unit, which may detract from passenger comfort and cause environmental disturbances when the fans pass through the wake of the pylon. This is referred to as a "masking" effect.

There is therefore a need to limit this "masking" effect that gives rise to a variation in pressure in the wake of the pylon. In the specific case of pylons supporting propulsion units, there is a need to eliminate the air flow deficit and therefore to reduce the velocity deficit over the surface thereof.

One of the solutions to this is to blow air from a high-pressure source near the trailing edge of the profile in order to eliminate the air flow deficit and therefore reduce the velocity deficit. To this end, document U.S. Pat. No. 4,917,336 describes an air ejection device comprising an ejection nozzle delivering air, in which device the air escapes through slots made on the suction face and the pressure face of a pylon supporting an aircraft propulsion unit. This solution has the disadvantage of not allowing the openings made in the pylon to be obstructed. A permanent opening on the aerodynamic profile of the pylon at the trailing edge thereof constitutes a break in the aerodynamic profile. Such a break generates disturbances in the air flow and therefore increases the induced drag during phases of flight for which the ejection of air is not needed. Furthermore, with no obturation of the opening, air has a tendency to enter the opening, further disturbing the flow.

In order to solve this problem, document FR 2971765 proposes a similar ejection device further comprising two gratings comprising holes through which air is ejected. The gratings can move relative to one another, allowing the holes to be partially or fully obstructed as the situation dictates, for example as the incidence of the pylon varies. Such a device is, however, complicated to use because it requires a system controlling the opening and closing of the gratings. It is difficult to achieve in terms of manufacturing tolerances and is also not very robust.

SUMMARY

The embodiments described herein overcome at least one of the disadvantages of the prior art by proposing an air ejection device comprising a profile provided with a first opening and an ejection nozzle opening into the first opening. The ejection device comprises a flexible tongue fixed in the continuity of the profile in such a way as to obstruct the opening, the flexible tongue being able to lift under the effect of a pressure differential between the air situated in the ejection nozzle and the outside air. The tongue allows the opening made in the profile to be obstructed during motion (phases of flight in the case of an aircraft aerodynamic profile) for which the ejection of air is unnecessary. In this way, outside air is prevented from entering it. The flow of air over the surface of the profile is therefore unaltered, making it possible to avoid an increase in induced drag. In particular, the tongue may be fixed flush with the aerodynamic profile to extend in the continuity of the profile. The latter therefore exhibits no discontinuity or roughness likely to disturb the flow of the air.

The fact that the tongue is flexible and able to lift under the effect of a simple pressure differential between the air situated inside the ejection nozzle and the outside air offers the advantage that there is no need to provide any mechanism for opening it.

According to one advantageous feature, the air ejection device comprises a blowing box (a pressurized chamber), the ejection nozzle constituting a narrowing of the blowing box, the narrowing being curved in such a way that the air contained in the blowing box is ejected through the opening tangential to the profile.

In one particular embodiment, the blowing box further comprises stiffeners extending in a plane perpendicular to the longitudinal direction of the opening.

In another particular embodiment, the blowing box comprises a baffle plate (a plate that homogenizes the air) situated at the inlet to the ejection nozzle arranged in the box in such a way that the air entering the ejection nozzle passes through said baffle plate.

In another particular embodiment, the blowing box, the ejection nozzle, and the baffle plate situated at the inlet of the injection nozzle are produced as a single piece.

In one particular embodiment, the opening is a slot made over the entire length of the profile.

In yet another particular embodiment, the cross section of the ejection nozzle in a plane perpendicular to a longitudinal direction of the opening is in the shape of a comma.

In one particular embodiment, the ejection device comprises, in the region of the opening, stiffeners uniformly distributed along the length of the profile.

In a further particular embodiment, the flexible tongue is made up of several parts of different rigidities along the length of the profile.

Other embodiments relate to a pylon supporting a propulsion unit for an aircraft comprising an air ejection device and finally to an aircraft comprising such a device.

Other objects, features, and advantages will become apparent from the following detailed description, given by way of nonlimiting example and made with reference to the attached drawings, in which:

BRIEF DESCRIPTION OF THE DRAWINGS

The following detailed description is merely exemplary in nature and is not intended to limit the embodiments or the application and uses of the embodiments. Furthermore, there is no intention to be bound by any theory presented in the preceding background of the embodiments or the following detailed description.

DETAILED DESCRIPTION

Figure 1:
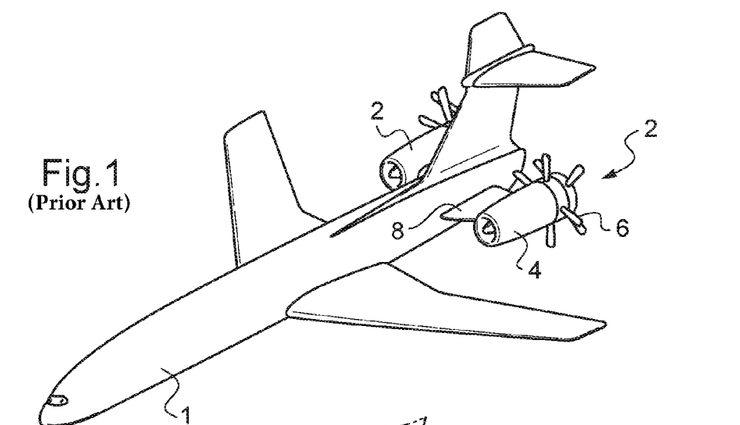
FIG. 1 is a schematic perspective view of an airplane propelled by two contra-rotating propeller engines mounted downstream of the wings of the airplane.
Figure 2:
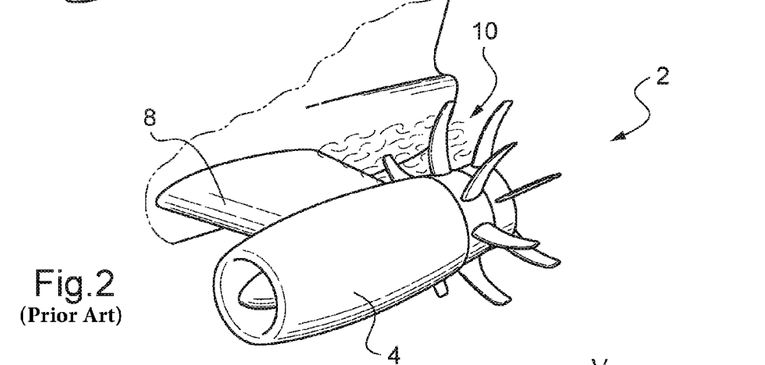
FIG. 2 is a schematic perspective view of a detail of FIG. 1, comprising the zone subjected to the disturbances caused by a pylon supporting one of the engines.
Figure 3:
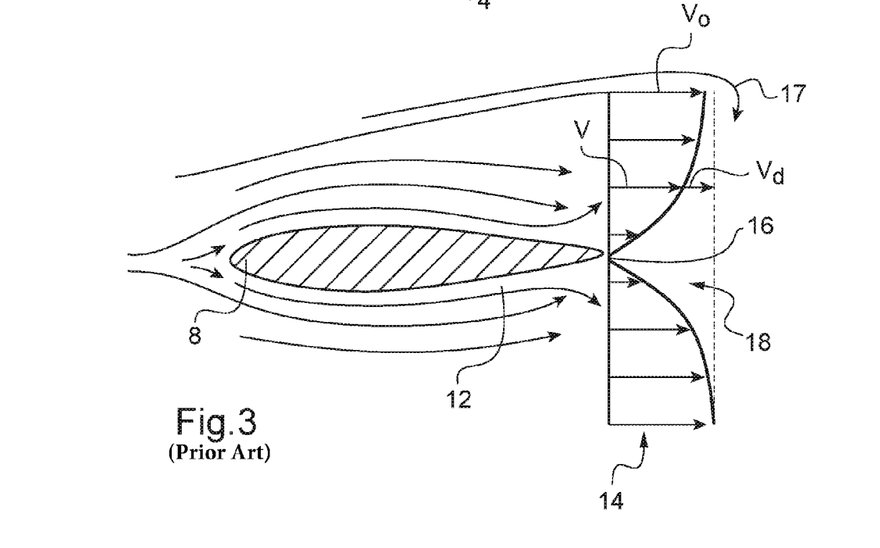
FIG. 3 is across sectional view of the aerodynamic profile of the pylon of FIG. 2, also illustrating the viscous boundary layer on its surface and the air velocity profile downstream of the velocity profile.

FIG. 1 illustrates an airplane fuselage 1 comprising a propulsion system 2, an engine contained in a nacelle 4, and propellers 6, in accordance with the prior art. It is also conceivable to have just one propeller per propulsion system. This nacelle 4 is supported by and connected to the fuselage 1 by a pylon 8. The term pylon here refers to an aerodynamic fairing surrounding the structure supporting the propulsion system and any devices that may be connected thereto. Such devices have not been depicted. As explained hereinabove, during flight, the pylon 8 causes disturbances and turbulence in its wake 10 as illustrated in FIG. 2. FIG. 3 illustrates the fact that the thickness of the boundary layer 12 increases progressively in the downstream direction of the profile of the pylon 8, leading to the velocity profile 14.

The velocity profile 14 of the trailing edge 16 of the pylon 8 has a velocity shortfall (or deficit) $V_d$ in the zone 18 situated downstream of the pylon 8. This velocity shortfall $V_d$ corresponds to the difference between the free flow velocity $V_0$ and the local velocity V in the example considered in FIG. 3.

The zone 18 exhibiting this velocity shortfall $V_d$ also exhibits a mass flow rate shortfall which has the effect of pulling air into it along a path indicated schematically by the arrow 17.

Figure 4:
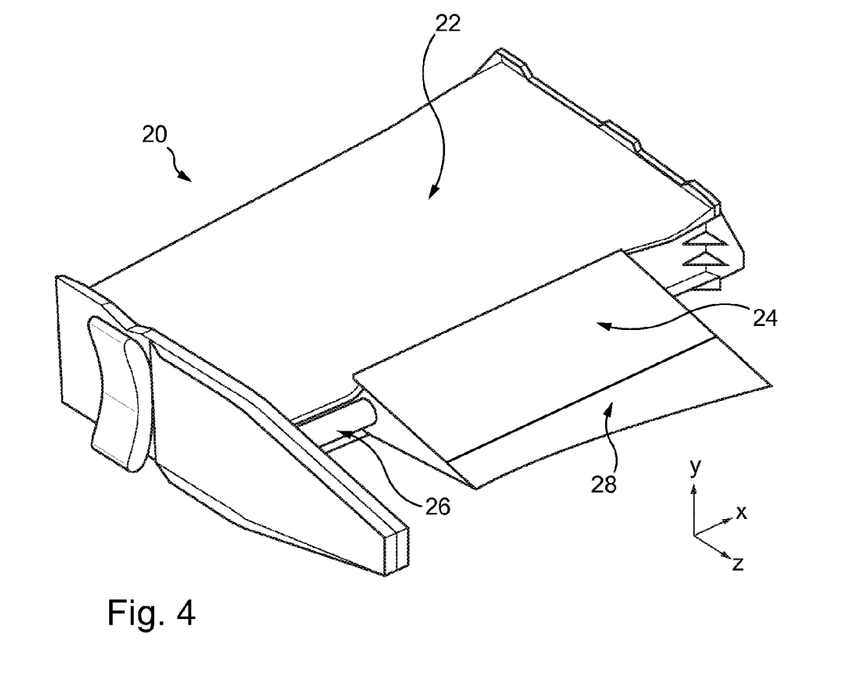
FIG. 4 is a schematic perspective view of part of a pylon intended to support a propulsion unit for an aircraft provided with an aerodynamic profile according to an embodiment.

The ejection device 19 illustrated in FIGS. 4-8 makes it possible to alleviate this velocity shortfall (deficit). In what follows, the profile of the ejection device is incorporated into that of an aircraft pylon but it may be mounted on other surfaces of the aircraft. The terms pylon, pylon profile, or ejection device profile will therefore be used interchangeably. In this particular instance, it is an aerodynamic profile. FIG. 4 illustrates a pylon 20 extending along an axis X and comprising a primary structure 22 provided with a blowing box (i.e. a pressurized chamber) 24 supplied with air by a blowing pipe 26 (feed pipe). The blowing box 24 is situated in the trailing edge 28 of the pylon 20. In FIG. 4, by way of example, blowing box 24 is situated more than half way along the chord of the pylon 20 (in fact, it is preferably situated over 75% of the way along the chord of the pylon 20), the chord extending along the axis Z. Air from the blowing pipe 26 comes, for example, from the aircraft engine. This is therefore pressurized air bled off by an air bleed system that has not been depicted but which is known in the prior art.

Figure 5:
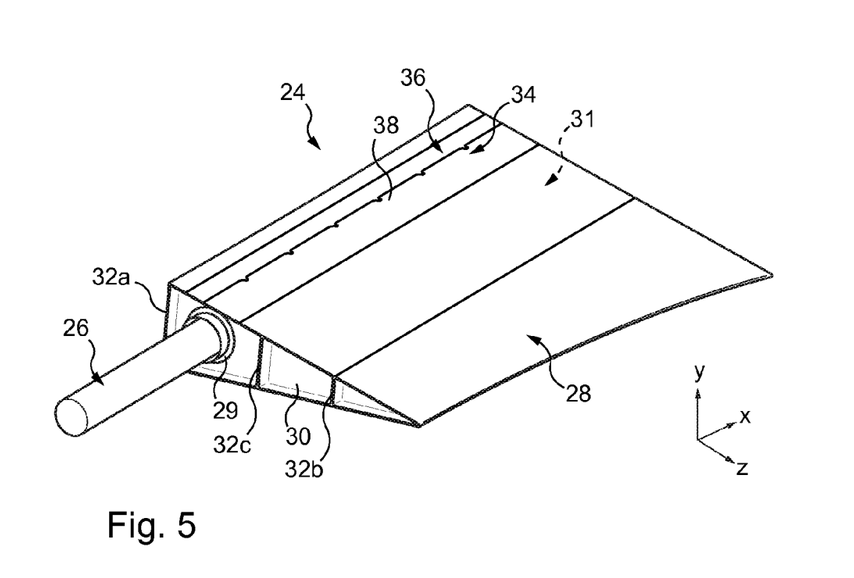
FIG. 5 is a schematic perspective view of a detail of a detail shown in FIG. 4.

It will be noted that in the embodiment depicted in FIG. 5, the blowing pipe 26 stops at the inlet 29 of the blowing box 24. The inlet 29 is made in a lateral rib 30 of the blowing box 24 of the trailing edge of the pylon 20 and is dimensioned so as to allow the volume 31 of the blowing box 24 to be supplied with air. The volume 31 of the blowing box 24 extends from a front rib 32a of the pylon 20 (furthest from the trailing edge 28), as far as a rear rib 32b (closest to the trailing edge 28). Thus, this volume 31 includes an intermediate rib 32c of the pylon 20. The blowing pipe 26 may extend beyond the rear spar 30 into the blowing box 24. In such a case, the blowing pipe 26 passes through the rear spar 30 and extends over all or part of the length of the pylon 20, i.e. along the axis X. The blowing pipe 26 may be regularly pierced in order to allow air to escape into the blowing box 24. The advantage connected with this alternative is that the air inside the volume 31 of the blowing box 24 is more uniform.

Once it has left the blowing pipe 26, the air spreads out in the blowing box 24 as was seen earlier and escapes via the ejection zone 34. The ejection zone 34 forms part of the volume 31 of the blowing box 24 and is situated near the front rib 32a. In other words, the ejection zone 34 is distant from the trailing edge 28 of the pylon 20. Ejection zone 34 it comprises an opening 36 made in the external surface of the aerodynamic profile of the pylon 20 as is particularly visible in FIG. 6. In this particular instance, the opening 36 is a slot extending over the entire length of the profile of the pylon 20, along the axis X. Indeed it is preferable, in the case of a profile built into a pylon supporting a propulsion unit with propellers, for the opening 36 to extend over a maximum length along the axis X so as to blow air over the entire propeller blade or even beyond. The opening 36 may, however, also extend over just part of the length of the profile of the pylon 20. In what follows, and nonlimitingly, the opening 36 will be referred to as a slot. The slot 36 is made in the suction face 38 of the pylon 20. However, it is also conceivable to make such a slot 36 in the pressure face of the aerodynamic profile of the pylon 20 or even in both the suction face and the pressure face of the aerodynamic profile of the pylon 20. In what follows, and in a nonlimiting manner, reference will be made to the embodiment depicted with a slot 36 made in the suction face 38 of the profile of the pylon 20.

Figure 6:
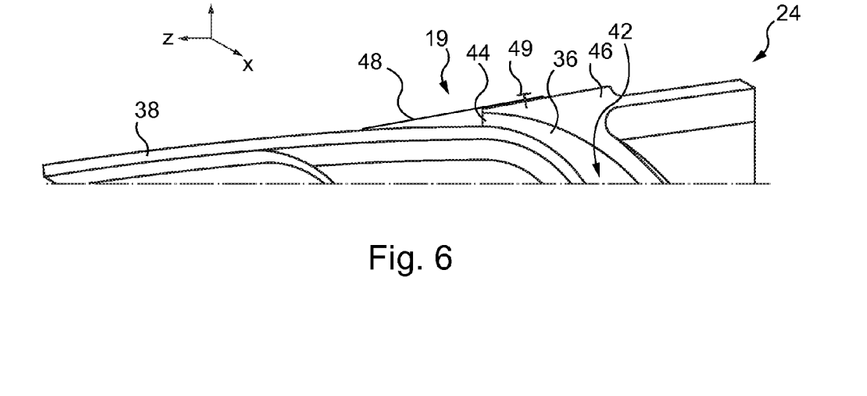
FIG. 6 is a cross-sectional view of part of an aerodynamic profile according to one embodiment.

The ejection zone 34 and the elements of the ejection device 19 located there will now be described in greater detail with reference to FIG. 6 which is a view of the YZ plane perpendicular to the axis X.

The ejection device 19 comprises an ejection nozzle 42 the end of which 44 (end directed toward the outside of the profile 20) opens into the slot 36. This end 44 is more particularly directed opposite the trailing edge 28 of the pylon 20 so that the air leaving it is directed toward the trailing edge 28 of the pylon 20. The end 44 of the ejection nozzle 42 is delimited by a reinforcing rib 46 that extends over all or part of the length of the pylon 20, on the one hand, and on the other hand, by the suction face 38 of the pylon 20. The reinforcing rib 46 is situated as an additional thickness in relation to the suction face 38 of the pylon 20 so that the air remains in contact with the suction face 38 of the pylon 20 as it is ejected and is directed toward the trailing edge 28.

It will be noted that the slot 36 and the reinforcing rib 46 here extend over the entire length of the pylon 20. The ejection device 19 further comprises a flexible tongue 48 flush with the suction face 38, so as to obstruct the slot 36. Here it is fixed to the reinforcing rib 46.

Thus, when no flow of air from the blowing box 24 is ejected by the ejection nozzle 42, the slot 36 is obstructed. This makes possible the prevention of the boundary layer of air flowing over the suction face 38 from rushing into the slot 36. Furthermore, because the flexible tongue 48 is fixed flush to the suction face 38, it ensures the continuity of the profile of the suction face 38 on either side of the slot 36. In other words, because of the presence of the flexible tongue 48, the suction face 38 is continuous and smooth from the trailing edge 28 as far as the reinforcing rib 46. The flow of air over the suction face 38 is therefore not disturbed by the presence of the slot 36 because the flexible tongue 48 does not form any roughness on the surface of the suction face 38.

In a further embodiment, the flexible tongue 48 may be made up of several parts of different rigidities along the pylon 20 (along the axis X). That makes it possible, depending on the flexibility of each of the parts, to vary the dimensions of the slot 36 along the pylon 20 and therefore the air flow rate blown onto the blades of the propeller of the propulsion system 2. It is thus possible to blow more air over the tip of a blade than over the base of the blade. The flexible tongue 48 is also able to lift under the effect of a pressure differential between the air situated inside the ejection nozzle 42 and the outside air.

The flexible tongue 48 is preferably made of aluminum, of a composite material such as a carbon fiber reinforced plastic (CFRP in which plastic is reinforced with films of carbon), or an elastomeric material. Thus, the flexible tongue 48 lifts only when air is being ejected, or in other words, only when necessary.

The flexible tongue 48 is, for example, fixed to the reinforcing rib 46 using fasteners 49 uniformly distributed along the length of the pylon 20.

For example, the fasteners 49 may be fixed with a countersunk head of diameter 3.2 mm. Alternatively, in an embodiment that has not been depicted, the flexible tongue 48 may be fixed to the reinforcing rib 46 by bonding or welding.

The inside of the blowing box 24 in conjunction with the ejection nozzle 42 will now be described. The ejection nozzle 42 constitutes a narrowing of the blowing box 24.

In other words, the air contained in the volume 31 (FIG. 4) of the blowing box 24 passes continuously from the blowing box 24 to the ejection nozzle 42. The cross-sectional area of the ejection nozzle 42 in the plane YZ perpendicular to the longitudinal direction of the pylon 20 is smaller than the cross-sectional area of the rest of the blowing box 24 in this same plane YZ. The ejection nozzle 42 also has a curved shape so that the air contained in the blowing box 24 is ejected via its end 44 such that it is tangential to the suction face 38 of the pylon.

More specifically, the cross section of the ejection nozzle 42 in a plane (YZ) perpendicular to the longitudinal direction (in the direction of the axis X) of the slot 36 is in the shape of a comma, the curved end 44 of which is directed toward the trailing edge 28 of the pylon. The widened other end of the ejection nozzle 42 opens into the blowing box 24.

Such a configuration takes into account the aerodynamic conditions that allow air to be ejected tangentially to the surface of the aerodynamic profile (in this instance the profile of the pylon 20). In particular, the curved shape of the end 44 means that the air has to make an "about turn" before being ejected.

Furthermore, the curved shape of the end 44 makes it possible to achieve an assembly made up of a blowing box 24 and of an ejection nozzle 42 which is compact. That notably means that such an assembly can be situated as close as possible to the rear spar 30 of the pylon 20. This has the advantage that the position of the rear spar 30 of the primary structure 22 of the pylon can be set as far back as possible, thus making it possible to maximize the chord of the pylon 20 and therefore improve the mechanical integrity thereof.

The comma-shape of the ejection nozzle 42 also allows the aerodynamic conditions to be optimized further by ensuring that the air is ejected at a tangent to the surface of the aerodynamic profile of the pylon 20.

Figure 7A:
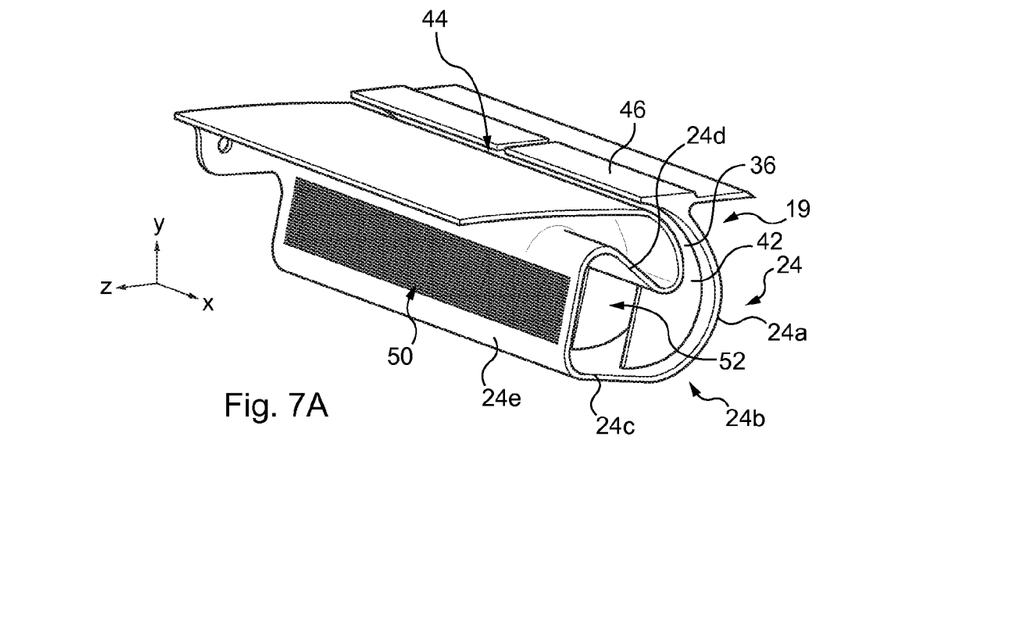
FIG. 7A is a schematic perspective view of an air ejection device provided with a baffle plate situated at the inlet to the ejection nozzle according to an embodiment.
Figure 7B:
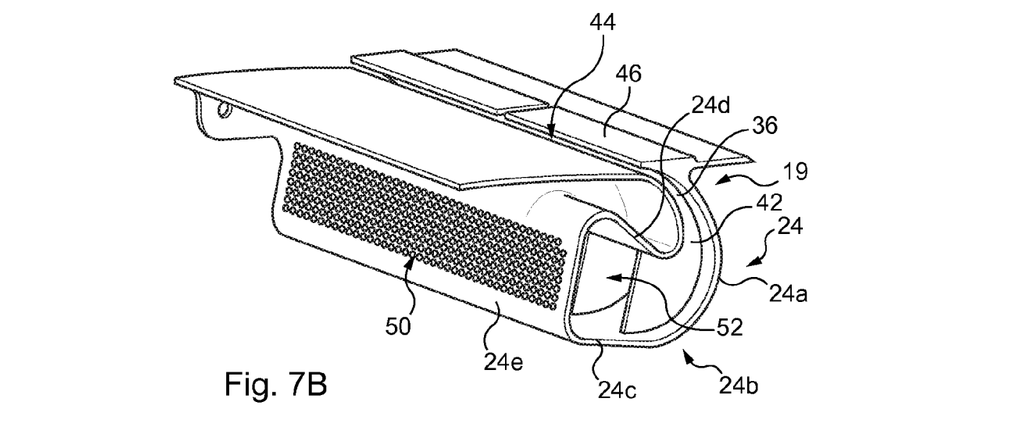
FIG. 7B is a schematic perspective view of an air ejection device provided with a baffle plate situated at the inlet to the ejection nozzle according to a further embodiment.
Figure 8:
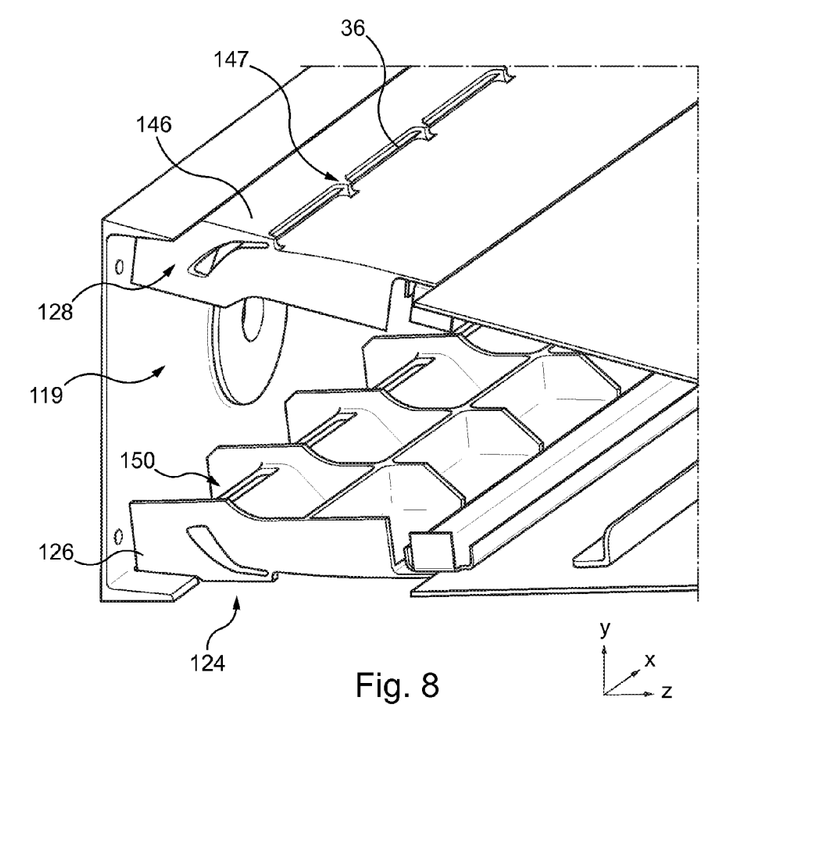
FIG. 8 is a schematic perspective view of an aerodynamic profile provided with an air ejection device according to a third still further embodiment.

FIGS. 7 and 8 illustrate two distinct embodiments of the complementary elements of the blowing box 24. In a preferred embodiment illustrated in FIG. 7, the blowing box 24 comprises a first part 24a extending from the curved shape of the ejection nozzle 42, and widening as far as a second part 24b. The second part 24b in the plane YZ has a cross section of substantially rectangular shape. It thus comprises a flat surface 24e comprising a baffle plate (plate for homogenizing the air) 50, or a separating filter, situated at the inlet to the ejection nozzle 42. The flat surface 24e is connected on the one hand to the first part 24a through a lower joining surface 24c that is perpendicular to the flat surface 24e, and is connected on the other hand to the first part 24a via an upper joining surface 24d that is slightly oblique with respect to the lower joining surface 24c. The flat surface 24e, and, therefore, the baffle plate 50, are positioned in the blowing box 24 substantially perpendicular to the suction face 38, or in other words in a plane substantially parallel to the plane XY.

In the path of the air arriving from the blowing pipe 26, the baffle plate 50 is positioned upstream in the blowing box 24 with respect to the ejection nozzle 42. Thus, air from the blowing pipe 26 advantageously passes through the baffle plate 50 to be homogenized before it expands in the volume 31 of the blowing box 24. In other words, the baffle plate 50 constitutes the inlet to the blowing box 24, via which inlet air from the blowing pipe 26 arrives.

FIGS. 7A and 7B illustrate two options for the baffle plate 50, comprising holes of different shapes and cross sections. Thus, the baffle plate 50 of FIG. 7A comprises rectangular holes extending along the entire length of the filter. In FIG. 7B, the baffle plate 50 comprises holes of circular shape, uniformly distributed in a number of rows, in this instance seven rows, along the entire length and the entire width of the plate. It goes without saying that the size, number, layout and shape of the holes may vary in order best to suit the required ejection conditions i.e. the pressure and flow rate that are desired in the ejection nozzle 42. Thus, for preference, the holes are dimensioned in such a way as to obtain a homogeneous flow.

Still according to the embodiment illustrated in FIGS. 7A and 7B, the blowing box 24 further comprises internal stiffeners 52 extending in a plane perpendicular to the longitudinal direction of the slot 36 (the direction X), namely in a transverse plane of the blowing box 24. In this instance, the internal stiffeners 52 run in planes parallel to the plane YZ or even perpendicular to the axis X. The function of the internal stiffeners 52 is to reinforce the blowing box 24 structurally and thus prevent excessive deformation of the end 44 of the ejection nozzle 42 and therefore of the slot 36 when the latter experiences loadings during flight. This is because any alteration to the shape of the end 44 may prove detrimental to the required constancy of the flow of air to be ejected. The reinforcement provided by the internal stiffeners 52 allows this to be avoided. The internal stiffeners 52 are preferably uniformly distributed over the length of the blowing box 24. In one embodiment, the internal stiffeners 52 are, for example, made of aluminum having a thickness of about 2 mm thick, and are arranged every 150 mm. The number of internal stiffeners 52 may naturally vary according to the loadings experienced by the end 44.

The presence of at least one internal stiffener 52 is positioned inside the blowing box 24 offers the advantage of reinforcing the end 44 of the ejection nozzle 42 without altering the external surface of the pylon 20. This means that the flow of air over the aerodynamic profile thereof is undisturbed. It is to be noted that the gap (separation) between each of the internal stiffeners 52 is dependent on a number of factors. Thus, for a given manufacturing tolerance on the slot 36, the more rigid the material used (for example if use is made of titanium rather than aluminum) or the thicker the internal stiffeners 52, the greater the possibility of increasing the gap between the internal stiffeners 52. Conversely, for a given material and thickness of internal stiffener 52, the tighter the manufacturing tolerance on the slot 36 will be the smaller the gap between two successive internal stiffeners 52 will have to be.

For preference, the blowing box 24, the ejection nozzle 42, and the baffle plate 50 are produced as a single piece. Such a piece may preferably be manufactured by three-dimensional printing ("additive layer manufacturing") or by casting. For preference, the material chosen may be titanium or aluminum, which provides a good compromise between mechanical strength and reduction of on-board mass. This method of manufacture ensures better flow of air through the blowing box 24 and the slot 36 and better homogenization of this air flow notably thanks to the fact that defects in the shape of the component are limited. Furthermore, it allows easier positioning of the internal stiffeners 52, which is more difficult to achieve using machining methods. There is therefore no need to place external stiffeners on the aerodynamic surface of the pylon 20, thus further limiting disturbances of the boundary layer of air thereof during flight still further.

In one alternative embodiment illustrated in FIG. 8, which is better suited to manufacture by conventional machining, a blowing box 124 is limited to a bottom base 126 and a top base 128 which are separated by an empty space through which the air diffuses. In this embodiment, the blowing pipe (not depicted) passes through the pylon 20 along the entire length (along the axis X) thereof. The top base 128 comprises an ejection device 119 similar to that of the ejection device 19 is the previous embodiment, apart from the fact that the reinforcing rib 146 comprises external stiffeners 147 uniformly distributed along the slot 36. These external stiffeners 147 perform the role of the internal stiffeners 52, namely they reinforce the end 44 of the ejection nozzle 42 to prevent it and the slot 36 from deforming during flight. The bottom base 126 comprises a baffle plate 150 that performs the same role as in the previous embodiment; namely it is positioned in such a way that air from the blowing pipe (not depicted in this figure) passes through it before being diffused in the blowing box 124. This solution is an alternative that is more economical because it does not rely on three-dimensional printing technology.

In an alternative embodiment connected to the previous one, the baffle plate is incorporated into the ejection nozzle. In this case, the blowing pipe stops at the inlet to the blowing box. One advantage to this is that the mass of the air ejection device is reduced.

Of course, other embodiments are possible. It will be noted that the air ejection device works whatever the shape of the blowing box, or even without there being a blowing box.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. An aircraft component having an air ejection device, the aircraft component comprising:
   a profile provided with a first opening and an ejection nozzle opening into the first opening, wherein dimensions of the first opening change over the length of the profile, and wherein a rate of air flow ejected from the first opening varies along the length of the profile; and
   a flexible tongue rigidly fixed to the profile in the continuity of the profile in such a way as to obstruct the first opening during the phases of flight for which the ejection of air is unnecessary, the flexible tongue being able to flex under the effect of a pressure differential between the air situated in the ejection nozzle and outside air during the phases of flight for which air is ejected.

2. An aircraft component according to claim 1, further comprising a blowing box, the ejection nozzle constituting a narrowing of the blowing box, the narrowing being curved in such a way that the air contained in the blowing box is ejected through the first opening tangential to the profile.

3. An aircraft component according to claim 2, further comprising stiffeners extending in a plane perpendicular to the longitudinal direction of the first opening.

4. An aircraft component according to claim 3, wherein the blowing box comprises a baffle plate situated at an inlet to the ejection nozzle arranged in the blowing box in such a way that the air entering the ejection nozzle passes through the baffle plate.

5. An aircraft component according to claim 4, wherein the blowing box, the ejection nozzle, and the baffle plate are produced as a single piece.

6. An aircraft component according to claim 5 wherein the first opening is a slot made over the entire length of the profile.

7. An aircraft component according to claim 6 wherein the cross section of the ejection nozzle in a plane perpendicular to a longitudinal direction of the first opening has substantially the shape of a comma.

8. An aircraft component according to claim 7 wherein the stiffeners are uniformly distributed along the length of the profile in the region of the stiffeners.

9. An aircraft component according to claim 8, wherein the flexible tongue is made up of a plurality of parts having different rigidities along the length of the profile to thereby change the dimensions of the slot over the length of the profile and thereby vary the rate of air flow ejected along the length of the profile.

10. A pylon to attach a propulsion unit to an aircraft, the pylon comprising:
an outer surface having an aerodynamic profile, the outer surface having an opening formed therein to eject air during at least some phases of flight, wherein dimensions of the first opening change over a length of the aerodynamic profile, and wherein a rate of air flow ejected from the first opening varies along the length of the profile;
an internal chamber having a nozzle therein configured to supply the air to the opening formed in the outer surface of the pylon; and
a flexible tongue rigidly attached to the outer surface and covering the opening formed therein, wherein the flexible tongue is configured to remain flush with the aerodynamic profile of the outer surface of the pylon during phases of flight in which the air is not ejected, thereby extending the continuity of the aerodynamic profile, but wherein the flexible tongue is further configured to flex under pressure from the air during other phases of flight when the air is ejecting to thereby permit the air to escape from the opening.

11. The pylon of claim 10 wherein the flexible tongue flexes only under the pressure from the air ejected by the nozzle, without assistance from an opening mechanism.

12. The pylon of claim 10, further the internal chamber comprises a blowing box, and wherein the nozzle constitutes a narrowing of the blowing box, the narrowing being curved in such a way that the air contained in the blowing box is ejected through the opening in a direction tangential to the outer surface.

13. The pylon of claim 12, wherein the outer surface comprises stiffeners extending in a plane perpendicular to a longitudinal direction of the opening.

14. The pylon of claim 13, wherein the blowing box comprises a baffle plate situated at an inlet to the nozzle arranged in the blowing box in such a way that the air entering the nozzle passes through the baffle plate.

15. The pylon of claim 14 wherein the cross section of the nozzle in a plane perpendicular to a longitudinal direction of the opening has substantially the shape of a comma.

16. The pylon of claim 10 wherein the opening is a slot that extends over the entire length of the aerodynamic profile.

17. The pylon of claim 16 wherein the propulsion unit comprises a propeller having blades, and wherein the rate of air flow ejected along the length of the aerodynamic profile varies so that more air is ejected over the tips of the blades than is ejected over the bases of the blades.

18. The pylon of claim 16 wherein the flexible tongue is made up of a plurality of parts having different rigidities along the length of the aerodynamic profile of the external surface to thereby change the dimensions of the slot over the length of the aerodynamic profile and thereby vary a rate of air flow ejected along the length of the aerodynamic profile.

19. The pylon of claim 18 wherein the propulsion unit comprises a propeller having blades, and wherein the rate of air flow ejected along the length of the aerodynamic profile varies so that more air is ejected over the tips of the blades than is ejected over the bases of the blades.

* * * * *